No. 735,551. PATENTED AUG. 4, 1903.
R. W. MESSENGER.
COMPARATIVE REGISTER.
APPLICATION FILED MAY 24, 1902.
NO MODEL. 2 SHEETS—SHEET 1.
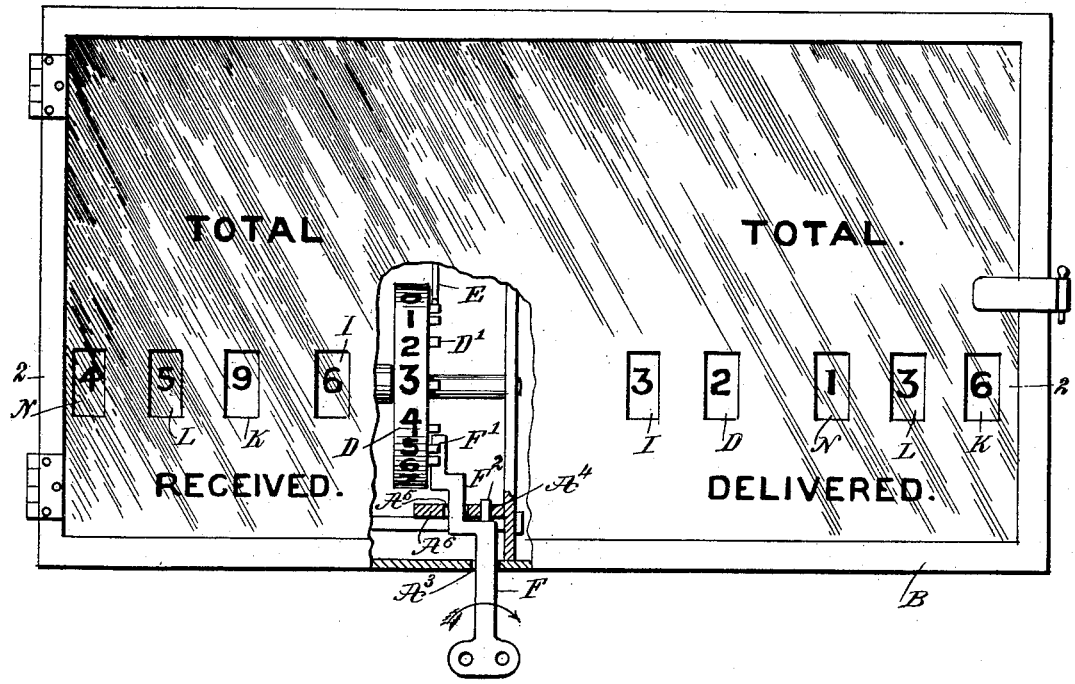
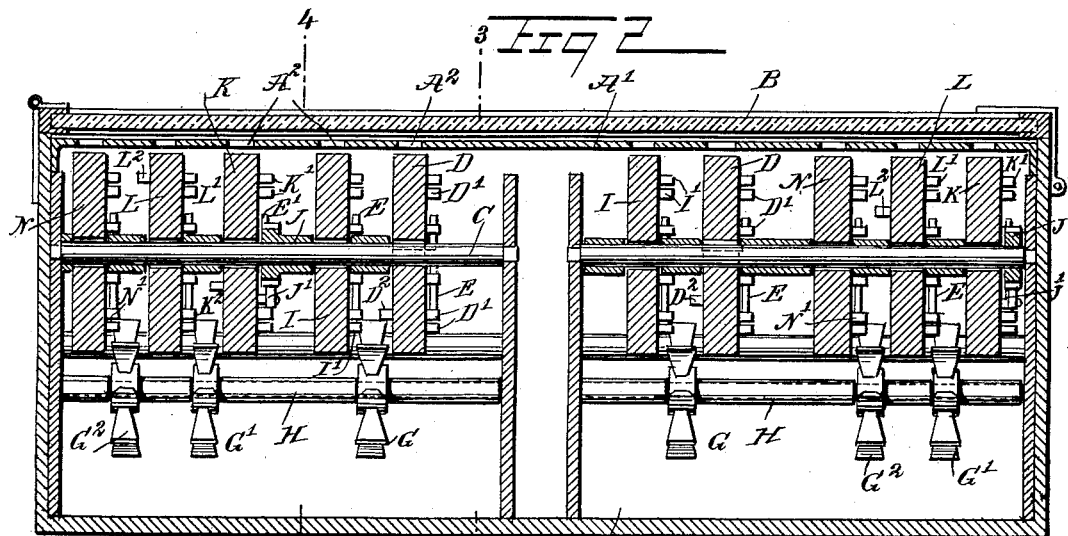
WITNESSES: H. H. Walker, Theo. G. Hoster
INVENTOR Robert W. Messenger
BY [signature]
ATTORNEYS.

No. 735,551. PATENTED AUG. 4, 1903.
R. W. MESSENGER.
COMPARATIVE REGISTER.
APPLICATION FILED MAY 24, 1902.
NO MODEL. 2 SHEETS—SHEET 2.
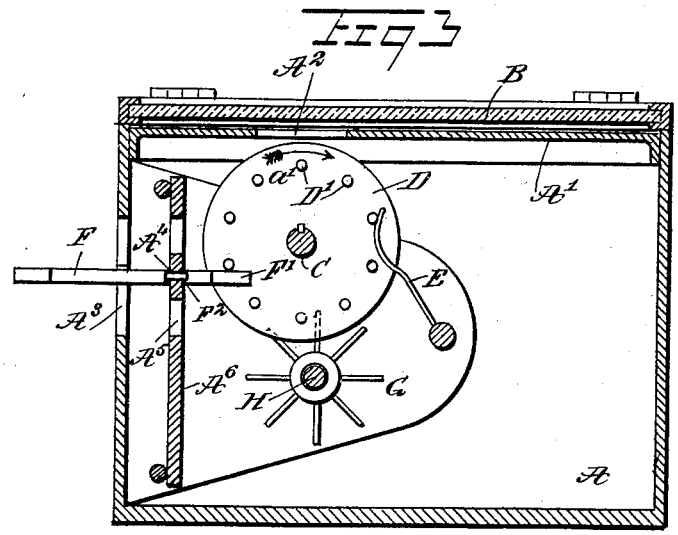
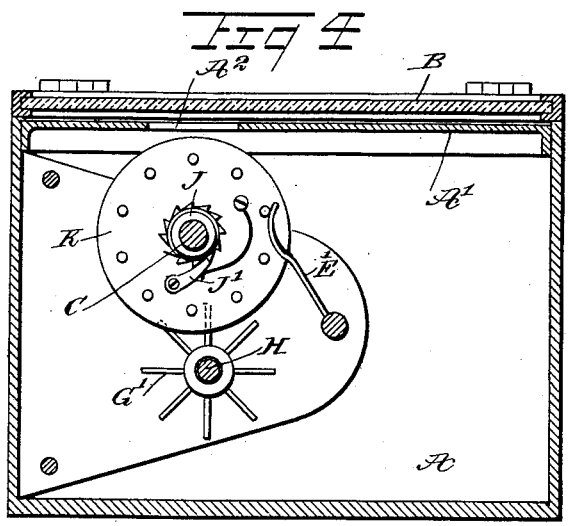
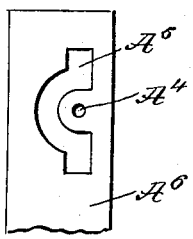
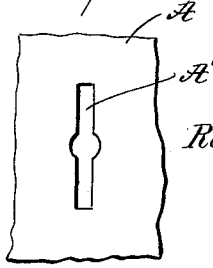
WITNESSES:
H. Walker
Rev. G. Hosket
INVENTOR
Robert W. Messenger
BY
ATTORNEYS No. 735,551. Patented August 4, 1903.

UNITED STATES PATENT OFFICE.

ROBERT W. MESSENGER, OF FEDERALSBURG, MARYLAND.

COMPARATIVE REGISTER.

SPECIFICATION forming part of Letters Patent No. 735,551, dated August 4, 1903.

Application filed May 24, 1902. Serial No. 108,813. (No model.)

*To all whom it may concern:*

Be it known that I, ROBERT W. MESSENGER, a citizen of the United States, and a resident of Federalsburg, in the county of Caroline and State of Maryland, have invented a new and Improved Comparative Register, of which the following is a full, clear, and exact description.

The object of the invention is to provide a new and improved comparative register designed for use in fruit canning and packing establishments and like places and arranged to readily determine the amount of work turned out by a workman during a certain length of time from the amount of raw material delivered to him—for instance, to register how many basketfuls of unpeeled tomatoes a peeler in a canning and packing establishment received during a day and how many basketfuls of peeled tomatoes he returned in the same time—thus enabling the person in charge of the establishment to obtain a comparative record of the labor of the peeler.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a plan view of the improvement, parts being in section. Fig. 2 is a longitudinal sectional elevation of the same on the line 2 2 of Fig. 1. Fig. 3 is a transverse section of the same on the line 3 3 of Fig. 2. Fig. 4 is a similar view of the same on the line 4 4 of Fig. 2. Fig. 5 is a face view of one of the inner keyholes, and Fig. 6 is a like view of one of the outer keyholes.

The improved comparative register is placed at or near the workman's bench or table and is mounted in a suitably-constructed casing A, having a fixed apertured top A' and a glass cover B, and within the said casing are arranged independent registering mechanisms, of which the one in the left-hand side of the casing is the receiving mechanism, designed to register the amount of raw material in unit measure received by the workman, and the other is located in the right-hand side of the casing and is the delivery mechanism employed for registering the amount of the finished work in the same unit measure delivered by the workman and turned out from the raw material received. The two registering mechanisms are alike in construction, so that it suffices to describe but one in detail.

A shaft C is mounted to turn in suitable bearings held in the casing A, and on the said shaft is keyed or otherwise fastened a units numeral-wheel D, formed on its peripheral surface with the consective numerals from "0" to "9," and on one face of the said numeral-wheel D are secured projecting pins D', arranged in a circle equally spaced apart and corresponding in number to the numerals on the peripheral surface of the wheel. A spring-dog E engages the pins D' (see Fig. 3) to hold the wheel against accidental turning in either direction, and the said pins are adapted to be engaged successively by the bit F' of a key F, extending through a keyhole $A^3$ in the front of the casing and through a keyhole $A^5$ in an auxiliary plate $A^6$, held within the casing and forming part thereof, as plainly shown in Fig. 3, the said plate $A^6$ having a bearing $A^4$ for the reduced end $F^2$ of the key F to limit the inward movement thereof and to hold the shank of the key in proper position for the bit to engage one of the pins D' at a time to turn the wheel D to bring the next numeral thereof to view through one of the apertures $A^2$ in the top A' of the casing. Thus when the key is inserted, as shown in Fig. 3, and a half-turn is given to the same then the bit F' engages one of the pins D' and turns the wheel D in the direction of the arrow $a'$, so that the next higher numeral is displayed in the aperture $A^2$. On the face of the numeral-wheel D opposite the one carrying the pins D' is arranged a single pin $D^2$, adapted to engage at every revolution of the numeral-wheel D one of the arms of a wheel G, mounted to rotate loosely on a shaft H, held in the casing A below the shaft C.

The arms of the wheel G are sufficiently wide for the arms to engage successively pins I', similar to the pins D' and projecting from one face of the tens-wheel I, mounted to rotate loosely on the shaft C and displaying its peripheral numerals through one of the apertures A² in the top A' of the casing. Now whenever the unit-wheel D completes a revolution its pin D² turns the wheel G by one of its arms, so that this arm in engagement with a pin I' turns the tens-wheel I to display the next higher numeral in the aperture A².

The device is used as follows: The unit and tens wheels D and I of both registering mechanisms are set to "0" at the beginning of the day's work by the person in charge of the establishment, and when a basketful of tomatoes, for instance, is brought to the peeler then the key F is inserted to turn the units-wheel D of the receiving-registering mechanism, so that the units-wheel displays the numeral "1" at the opening A², thus indicating that one basketful of tomatoes has been delivered to the peeler. This operation is repeated for every basketful of tomatoes delivered to the peeler during the day's work. When the peeler has filled a basket with peeled tomatoes, then the party taking away the basketful of such peeled tomatoes inserts the key F to turn the units-wheel D of the delivery-registering mechanism, so that the said units-wheel displays the numeral "1," and this operation is repeated for every basketful of peeled tomatoes taken away from the peeler. Now it will be seen that the comparative register at the end of the day's work indicates at the left-hand side how many basketfuls of unpeeled tomatoes have been delivered to the peeler, and the delivery-registering mechanism indicates how many basketfuls of tomatoes the peeler peeled from the tomatoes delivered to him. It will be seen that according to the skill of the peeler he is enabled to turn out more or less basketfuls of peeled tomatoes. For instance, as shown in Fig. 1, the peeler received sixty-three basketfuls and turned the same into thirty-two basketfuls of peeled tomatoes.

Now it is very important in large establishments to obtain a comparative record of the workmen employed, as those that are able to turn out more peeled tomatoes from a certain quantity than others are more effective workmen and more valuable to the establishment. Furthermore, the knowledge that any appreciable waste will appear at once and that any appreciable saving will commend itself to the foreman's and employer's eyes will tend to make the workmen careful to the utmost degree. It is also desirable to obtain a record of, say, a month's or a year's work of a certain peeler, and for this purpose each of the registering mechanisms is provided with supplementary registering-wheels indicating totals and controlled from the units registering-wheel D. For the purpose mentioned the shaft C is provided with a ratchet-wheel J, keyed or otherwise fastened to the shaft and engaged by a pawl J', fulcrumed on the units-wheel K, mounted to rotate loosely on the shaft C, and this units-wheel K is provided on one face with pins K', engaged by a dog E', to hold the numeral-wheel against accidental turning. The other face of this numeral-wheel is provided with a pin K², adapted to actuate a wheel G', similar to the wheel G and likewise mounted to rotate loosely on the shaft H. This wheel G' coöperates with pins L' on a tens-wheel L, mounted to rotate loosely on the shaft C and provided with a single pin L², adapted to engage a wheel G², similar to the wheels G and G' and also mounted to rotate loosely on the shaft H. The arms of the wheel G² are adapted to engage pins N' on a hundreds-wheel N, likewise mounted to rotate loosely on the shaft C, the said wheels K, L, and N displaying their peripheral numerals through apertures K² in the top A' of the casing. Now it will be seen that when the shaft C turns on turning the units-wheel D, actuated by the key F, then the shaft C turns the ratchet-wheel J, and the latter by the pawl J' turns the numeral-wheel K, so that the latter rotates with the wheel D. When the wheel K completes one revolution, its pin K² actuates the wheel J, and the latter acting on the pins L' turns the tens-wheel L, the same as the wheel G turns the tens-wheel I. The tens-wheel L on completing a revolution actuates the wheel G², which by its arms acting on the pins L' actuates the hundreds-wheel N for the latter to display the next higher numeral in the aperture A². If desired, a thousands and tens-thousands wheel may be employed and arranged as described and successively actuated one from the other; but I have found by practice that the three wheels K, L, and N are sufficient for obtaining a month's record of a peeler.

By having the ratchet-wheel J and pawl J' connected with the units-wheel K it is evident that the wheels D and I can be reset at the beginning of every day's work without changing the positions of the wheels K, L, and N.

Having thus described my invention, I claim as new and desire to secure by Letters Patent—

1. A comparative register, comprising a casing having two series of openings in one wall, two similar and independent registering mechanisms mounted end to end in the casing, each registering mechanism having units and tens wheels, the units-wheels being provided with a number of pins on one face and a single pin on its other face, and the tens-wheels with a number of pins on its face opposite the face of the units-wheel carrying the single pin, a wheel provided with arms adapted to be engaged by the single pin of the units-wheel to be turned thereby and to engage the pins of the tens-wheel to turn the same, and a key having an angular bit for engaging the pins of the units-wheels, as set forth.

2. A comparative register, comprising a casing, a units-wheel having on one face a single pin and on the other face a plurality of pins, a dog engaging the plurality of pins to hold the wheel against accidental turning, a key having an angular bit for engaging the pins of the wheel for turning the same, a tens-wheel loosely mounted on the shaft of the units-wheel and provided with pins on its face opposite the face of the units-wheel having a single pin, and a loosely-mounted wheel having peripheral arms projecting between the units and tens wheels and engaged by the pins thereof, as set forth.

3. A register of the character described, comprising a casing having keyholes in one wall, and provided with plates spaced from the wall having the keyholes therein, and each provided with a keyhole and a bearing, independent registering mechanisms in the casing, and a key having a reduced end and an angular bit, the bit of the key working in the inner keyhole, and engaging the pins of the units-wheel, as set forth.

4. In a comparative register, the combination of a shaft, a key-operated units-wheel secured thereon, a tens-wheel loosely mounted on the shaft, means for operating the tens-wheel from the units-wheel, a second units-wheel loosely mounted on the shaft, a pawl-and-ratchet mechanism for connecting the said wheel with the shaft, a tens-wheel loose on the shaft, means for operating it from the units-wheel, a hundreds-wheel loose on said shaft, and means for operating it from the tens-wheels, as set forth.

In testimony whereof I have signed my name to this specification in the presence of two subscribing witnesses.

ROBERT W. MESSENGER.

Witnesses:
  W. T. EDINGTEN,
  JOSEPH W. NOBLE.